UNITED STATES PATENT OFFICE.

CHARLES R. M. WALL, OF BROOKLYN, NEW YORK.

IMPROVED METHOD OF DECOLORIZING MALT LIQUORS.

Specification forming part of Letters Patent No. 50,523, dated October 17, 1865.

*To all whom it may concern:*

Be it known that I, CHARLES R. M. WALL, of Brooklyn, in the county of Kings and State of New York, have invented a new and Improved Process for Decolorizing Malt Liquors, &c.; and I do hereby declare that the following is a full, clear, and exact description thereof, which will enable others skilled in the art to fully understand and make use of the same.

This invention consists in throwing on the surface of the liquid during the boiling process the rays of the solar light or those of a calcium or other artificial light, either direct or by reflection, in such a manner that by the action of such light the liquid is bleached and the wort can be perfectly boiled without danger that the same will be colored any darker than desirable.

In the ordinary process of brewing pale ales great care must be taken in boiling, because by the slightest excess of heat the wort becomes dark and useless for pale ale. For this reason pale ales are usually imperfectly boiled, and thereby their brilliancy and keeping quality are impaired. This difficulty is obviated by exposing the wort, while in a state of ebullition, to the rays of the solar light, or of a calcium light, or any other suitable artificial light, which may be made to strike the surface of the boiling wort either directly or by reflection. By these means I am enabled to counteract the excessive color given to wort by boiling, and to produce a bleaching effect, which allows of boiling the wort intended to be pale for a longer time than it can be done in the ordinary manner. The brilliancy of the ale and its keeping quality are thereby improved, and the full benefit of the boiling process is obtained without impairing the color of the liquor.

By exposing the liquid while in a state of ebullition to the rays of light the surface of the liquid is presented to said rays in an elastic state, allowing the same to penetrate the globules and to exert a powerful decolorizing effect; and as the liquid in boiling continually changes its surface the whole mass is exposed to the rays of light, and a complete decolorization is effected.

I claim as new and desire to secure by Letters Patent—

Exposing wort or other liquid to be decolorized, while in a state of ebullition, to the rays of the sun or of a suitable artificial light, substantially as set forth.

CHAS. R. M. WALL.

Witnesses:
W. HAUFF,
WM. DEAN OVERELL.